United States Patent
Schoenlieb et al.

(10) Patent No.: US 11,906,427 B2
(45) Date of Patent: Feb. 20, 2024

(54) METHOD AND APPARATUS FOR DETERMINING A REFLECTIVITY VALUE INDICATING A REFLECTIVITY OF AN OBJECT

(71) Applicant: Infineon Technologies AG, Neubiberg (DE)

(72) Inventors: Armin Josef Schoenlieb, Seiersberg-Pirka (AT); Caterina Nahler, Thondorf (AT); Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 204 days.

(21) Appl. No.: 17/466,231

(22) Filed: Sep. 3, 2021

(65) Prior Publication Data

US 2022/0074856 A1 Mar. 10, 2022

(30) Foreign Application Priority Data

Sep. 7, 2020 (EP) .................................... 20194844

(51) Int. Cl.
   *G01N 21/55* (2014.01)
   *G01S 17/36* (2006.01)

(52) U.S. Cl.
   CPC .............. *G01N 21/55* (2013.01); *G01S 17/36* (2013.01); *G01N 2021/558* (2013.01)

(58) Field of Classification Search
   CPC .............. G01N 2021/558; G01N 21/55; G01N 2021/4709; G01N 21/27; G01N 21/49; G01N 21/6408; G01N 21/6456; G01N 2201/0691; G01N 2201/126; G01N 2201/129; G01N 21/4738; G01N 15/06; G01N 33/00; G01S 17/894; G01S 17/36; G01S 7/497; G01S 7/4865; G01S 17/89; G01S 17/10; G01S 7/4915; G01S 17/08; G01S 17/86; G01S 17/32; G01S 7/4914; G01S 7/4863; G01S 7/4866; G01S 7/493; G01S 7/4808; G01S 7/484; G01S 17/87;
   (Continued)

(56) References Cited

U.S. PATENT DOCUMENTS

| 9,864,048 B2 * | 1/2018 | Hall ..................... G01S 7/4811 |
| 10,230,874 B2 | 3/2019 | Tadano et al. |

(Continued)

FOREIGN PATENT DOCUMENTS

| CN | 103852754 B | * | 9/2017 | ............. G01S 17/36 |
| CN | 112073708 A | * | 12/2020 | ........... H04N 13/246 |

(Continued)

*Primary Examiner* — Michael P Stafira
(74) *Attorney, Agent, or Firm* — Murphy, Bilak & Homiller, PLLC

(57) ABSTRACT

A method for determining a reflectivity value indicating a reflectivity of an object is provided. The method includes performing a Time-of-Flight (ToF) measurement using a ToF sensor. A correlation function of the ToF measurement increases over distance within a measurement range of the ToF sensor such that an output value of the ToF sensor for the ToF measurement is independent of the distance between the ToF sensor and the object. The method further includes determining the reflectivity value based on the output value of the ToF sensor for the ToF measurement.

15 Claims, 1 Drawing Sheet

(58) Field of Classification Search
CPC ........ G01S 17/48; G01S 7/4802; G01S 17/26; G01S 7/487; G01S 7/4811; G01S 7/4861; G01S 7/4816; G01S 11/12; G01S 17/42; G01S 3/78; G01S 7/4815; G01S 7/4913; G01S 17/06; G01S 17/88; G01S 7/006; G01S 5/16; G01S 7/499; G01S 17/00; G01S 17/50; G01S 17/74; G01S 13/36; G01S 13/89; G01S 15/36; G01S 15/89; G01S 17/14; G01S 17/58; G01S 7/352; G01S 7/4813; G01S 7/4911; G01S 17/02; G01S 17/46; G01S 7/4804; G01S 7/483; G01S 7/4917; G01S 7/4918; G01S 15/06; G01S 15/08; G01S 15/86; G01S 15/88; G01S 15/93; G01S 17/003; G01S 17/18; G01S 17/933; G01S 7/481; G01S 7/4817; G01S 7/489; G01S 7/52006; G01S 7/539

See application file for complete search history.

(56) References Cited

U.S. PATENT DOCUMENTS

| | | | |
|---|---|---|---|
| 2012/0176476 A1* | 7/2012 | Schmidt | G01S 17/894 348/46 |
| 2016/0112696 A1* | 4/2016 | Dielacher | G01S 17/08 348/46 |
| 2016/0178512 A1 | 6/2016 | Hall et al. | |
| 2020/0167942 A1* | 5/2020 | Plank | G01S 17/36 |

FOREIGN PATENT DOCUMENTS

| | | | | |
|---|---|---|---|---|
| DE | 102016219170 A1 | * | 5/2017 | |
| DE | 102013207653 B4 | * | 11/2018 | ............ G01S 17/36 |
| DE | 102018220932 A1 | * | 6/2020 | ........ G01N 21/4738 |
| WO | WO-2013104717 A1 | * | 7/2013 | ............ G01S 17/02 |

* cited by examiner

METHOD AND APPARATUS FOR DETERMINING A REFLECTIVITY VALUE INDICATING A REFLECTIVITY OF AN OBJECT

TECHNICAL FIELD

The present disclosure relates to reflectivity sensing. In particular, examples relate to a method and an apparatus for determining a reflectivity value indicating a reflectivity of an object using a Time-of-Flight (ToF) sensor.

BACKGROUND

Two-dimensional imaging with ToF cameras is used for object detection and classification (e.g. facial recognition, production, smart surveillance, . . . ).

If a scene is illuminated by a light source close to the light capturing part, the measured light intensity depends on the distance to the object according to the inverse square law for point sources. This prohibits measuring the actual reflectivity of the object, which is important information for object recognition. Further, a close object reflects too much light, which can lead to saturation at the ToF camera. Additionally, if the light source is located close to the light capturing part, close objects (e.g. a cover glass or an Organic Light Emitting Diode, OLED, display) will cause stray light into the light capturing part.

Hence, there may be a demand for improved reflectivity sensing using ToF sensors.

SUMMARY

An example relates to a method for determining a reflectivity value indicating a reflectivity of an object. The method comprises performing a ToF measurement using a ToF sensor. A correlation function of the ToF measurement is increasing over distance within a measurement range of the ToF sensor such that an output value of the ToF sensor for the ToF measurement is independent of the distance between the ToF sensor and the object. The method further comprises determining the reflectivity value based on the output value of the ToF sensor for the ToF measurement.

Another example relates to an apparatus for determining a value indicating a reflectivity of an object. The apparatus comprises a ToF sensor configured to perform a ToF measurement. A correlation function of the ToF measurement is increasing over distance within a measurement range of the ToF sensor such that an output value of the ToF sensor for the ToF measurement is independent of the distance between the ToF sensor and the object. The apparatus further comprises a processing circuit configured to determine the reflectivity value based on the output value of the ToF sensor for the ToF measurement.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
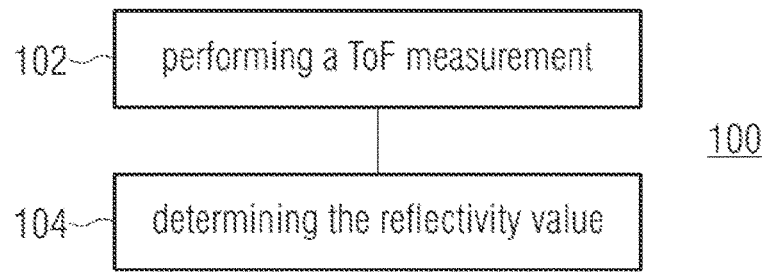
FIG. 1 illustrates a flowchart of an example of a method for determining a reflectivity value.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 2:
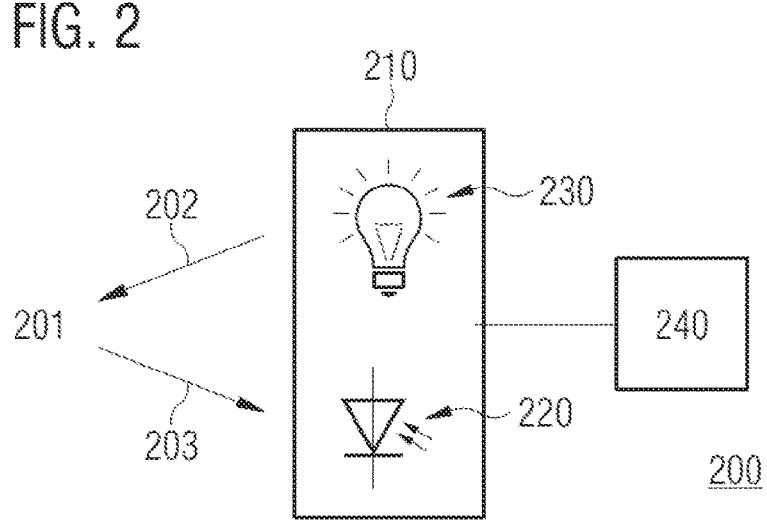
FIG. 2 illustrates an example of an apparatus for determining a reflectivity value.

FIG. 1 illustrates a flowchart of an example of a method 100 for determining a reflectivity value indicating a reflectivity of an object. The method 100 will be described in the following further with reference to FIG. 2 which illustrates an exemplary apparatus 200 for determining a reflectivity value indicating a reflectivity of an object 201.

The apparatus 200 comprises a ToF sensor 210. The ToF sensor 200 comprises an illumination element 230 for emitting modulated light 202 to a scene 201 comprising the object 201 and a light capturing element 220 for capturing light 203 received from the scene.

The illumination element 230 generates the modulated light 203. The illumination element 230 may comprise any number of light sources. The illumination element 230 may, e.g., comprise one or more Light-Emitting Diodes (LEDs) and/or one or more laser diodes (e.g. one or more Vertical-Cavity Surface-Emitting Lasers, VCSELs) which are fired based on an illumination signal.

The light capturing element 220 may comprise various components such as e.g. optics (e.g. one or more lenses) and electronic circuitry. In particular, the electronic circuitry comprises an image sensor comprising at least one photo-sensitive element or pixel (e.g. comprising a Photonic Mixer Device, PMD, or a Charge-Coupled Device, CCD). For example, the image sensor may comprise a plurality of photo-sensitive elements or pixels. The at least one photo-sensitive element or pixel is driven based on a reference signal.

The method 100 comprises performing 102 a ToF measurement using the ToF sensor 210. Parameters of the ToF sensor 210 are adjusted such that a correlation function (sensor response function) of the ToF sensor 210 for the ToF measurement is (e.g. strictly monotonic) increasing over distance within a measurement range of the ToF sensor 210 such that an output value of the ToF sensor 210 for the ToF measurement is independent of the distance between the ToF sensor 210 and the object 201.

Figure 3:
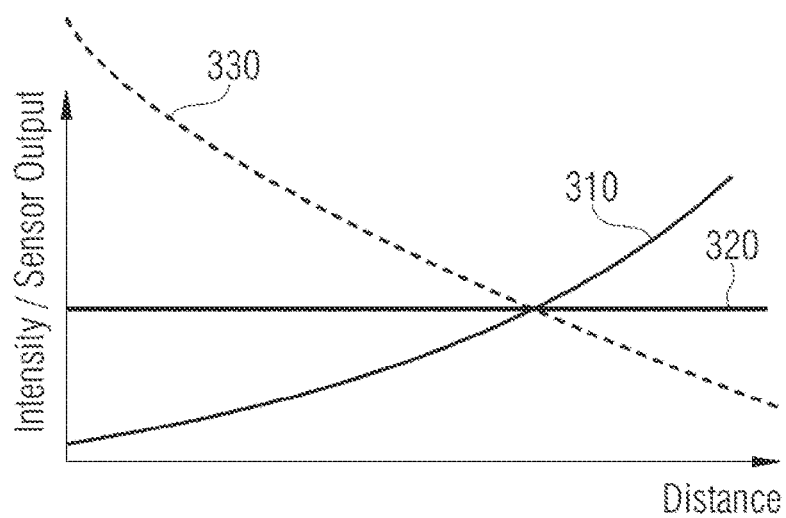
FIG. 3 illustrates exemplary courses over distance of a correlation function of a ToF sensor, an output value of the ToF sensor and a light strength of light received at the ToF sensor.

The correlation function represents an expected distance-dependent output of the ToF sensor 210 for the ToF measurement assuming that a light strength (intensity) of the light 203 received at the ToF sensor 210 during the ToF measurement is constant over distance within the measurement range of the ToF sensor 210. This is illustrated in FIG. 3. The abscissa of FIG. 3 denotes the distance between the ToF sensor 210 and the object 201. In the example of FIG. 3, it is assumed that the distances of the whole abscissa are within the measurement range of the ToF sensor 210. The ordinate denotes the output of the ToF sensor 210. An exemplary course 310 of the correlation function over distance is illustrated in FIG. 3. As can be seen from the exemplary course 310, the correlation function of the ToF measurement is increasing over distance (i.e. the correlation function increase for larger distances between the ToF sensor 210 and the object 201).

For the correlation function of the ToF measurement, it is assumed that the light strength of light received at the ToF sensor 210 during the ToF measurement is constant. Referring to the example of FIG. 2, it is assumed that—independent of the distance between the ToF sensor 210 and the object 201—the light strength of the light 203 reflected by the object 201 back to the light capturing element 220 is substantially constant.

However, the light strength of the light 203 received by the light capturing element 220 de facto depends on the distance between the ToF sensor 210 and the object 201. In particular, the light strength of the light 203 received by the light capturing element 220 decreases with increasing distance between the ToF sensor 210 and the object 201. This is further illustrated in FIG. 3. FIG. 3 illustrates an exemplary course 330 of the light strength of the light 203 received at the ToF sensor 210 over distance (the ordinate of FIG. 3 further denotes the light strength). As can be seen from the course 330, the light strength is decreasing over distance. For example, it may be assumed that the light strength decreases according to the inverse square law. That is, the distance-dependent light strength of the light 203 received at the ToF sensor 210 may be assumed as follows:

$$I(d) \propto \frac{1}{d^2} \quad (1)$$

with I denoting the light strength of the light received at the ToF sensor 210 and d denoting distance between the ToF sensor 210 and the object 201 reflecting the light 203 back to the ToF sensor 210.

Accordingly, adjusting the ToF sensor 210 such that the correlation function of the ToF sensor 210 for the ToF measurement is increasing over distance within the measurement range of the ToF sensor 210 allows to compensate for the decreasing light strength of the light 203 received at the ToF sensor 210. For example, the course 310 over distance of the correlation function may be adjusted to be inverse to the course 330 over distance of the light strength of the light 203 received at the ToF sensor 210. The distance-dependent correlation function c(d) may, e.g., be adjusted as follows:

$$c(d) \propto d^2 \quad (2)$$

As a consequence, the output value of the ToF sensor 210 for the ToF measurement is independent of the distance between the ToF sensor 210 and the object 201. This is further illustrated in FIG. 3, which illustrates an exemplary course 320 of the output value of the ToF sensor 210.

The output value of the ToF sensor 210 is proportional to the reflectivity of the object 201 as the reflectivity of the object 201 determines how much light arrives at the ToF sensor 210 during the ToF measurement. Accordingly, the output value of the ToF sensor 210 varies with the reflectivity of the object 201—independent of the distance between the ToF sensor 210 and the object. Therefore, the output value of the ToF sensor 210 allows to characterize the reflectivity of the object 201 when using a correlation function for the ToF measurement as described above.

Referring back to FIG. 1, the method 100 further comprises determining 104 a reflectivity value indicating the reflectivity of the object 201 based on the output value of the ToF sensor 210 for the ToF measurement. For example, determining 104 the reflectivity value may comprise applying at least one correction to the output value of the ToF sensor 210 for the ToF measurement. The output value of the ToF sensor 210 for the ToF measurement may, e.g., be scaled and/or offset-corrected to obtain the reflectivity value. Accordingly, systematic errors (e.g. noise) may be corrected.

The apparatus 200 comprises an accordingly configured processing circuit 240, which is coupled to the ToF sensor 210. For example, the processing circuit 240 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 240 may optionally be coupled to, e.g., read only memory (ROM) for storing software, random access memory (RAM) and/or non-volatile memory. The processing circuit 240 is configured to determine the reflectivity value indicating the reflectivity of the object 201 based on the output value of the ToF sensor 210 for the ToF measurement.

For example, the processing circuit 240 may further output data indicative of the reflectivity value (e.g. a two-dimensional image).

The apparatus 200 may comprise further hardware—conventional and/or custom.

In other words, a two-dimensional sensing method based on a ToF camera is proposed. The result of the sensing may, e.g., be a two-dimensional image in which the pixels respectively indicate the amount of light reflected by the object. As described above, this may be achieved by using a sensor response function which is close to the inverse of the function of the received light strength over distance. Since this makes the sensor output larger over distance, the loss of signal strength is compensated. This results in a constant sensor output of an object independent of the distance.

As described above, for performing 102 the ToF measurement, the method 100 comprises a) illuminating the scene comprising the object 201 with the modulated light 202 of the illumination element 230 based on an illumination signal and b) driving the light capturing element 230 based on a reference signal. For adjusting the correlation function of the ToF measurement such that it increases over distance within the measurement range of the ToF sensor 210, at least one of the illumination signal, the reference signal and a time offset between the illumination signal and the reference signal may be varied during the ToF measurement.

For the ToF measurement, a Coded Modulation (CM) measurement as well as a Continuous Wave (CW) measurement may be used.

For example, if a CW measurement is used for the ToF measurement, each of the illumination signal and the reference signal exhibits a respective alternating series of high and low pulses of equal duration (length). Therefore, the modulated light 202 is a series of light pulses with equal pulse length (duration) and equal pulse spacing. For adjusting the correlation function of the ToF measurement such that it increases over distance within the measurement range of the ToF sensor 210, the time offset between the illumination signal and the reference signal may be varied during the CW measurement.

Alternatively, if a CM measurement is used for the ToF measurement, at least one of the illumination signal and the reference signal exhibits a respective alternating series of high and low pulses of varying duration (length). For example, the modulated light 202 may be a series of light pulses with varying pulse length (length) and/or varying pulse spacing. Similarly, the reference signal may exhibit an alternating series of high and low pulses of varying duration for a CM measurement. In other examples, the modulated light 202 may be a series of light pulses with equal pulse length and equal pulse spacing, whereas the reference signal exhibits an alternating series of high and low pulses of varying duration. For adjusting the correlation function of the ToF measurement such that is increases over distance within the measurement range of the ToF sensor 210, the respective alternating series of high and low pulses may be varied for at least one of the illumination signal and the reference signal during the CM measurement. Alternatively or additionally, the time offset between the illumination signal and the reference signal may be varied during the CM measurement.

By varying one or more of the illumination signal, the reference signal and the time offset between the illumination signal and the reference signal during the ToF measurement, the ToF sensor 210 can create a manifold of different auxiliary correlation functions. Irrespective of whether a CW or a CM measurement is performed, the ToF sensor 210 temporarily exhibits the respective auxiliary correlation function for each variation of the illumination signal, the reference signal and the time offset between the illumination signal and the reference signal used during the ToF measurement. The resulting (overall) correlation function of the ToF measurement may be understood as a combination (e.g. a sum) of the different auxiliary correlation functions used during the ToF measurement. In other words, the resulting (effective) correlation function of the ToF sensor 210 for the ToF measurement is a combination of the auxiliary correlation functions for the variations of the illumination signal, the reference signal and the time offset between the illumination signal and the reference signal used during the ToF measurement. For example, by switching auxiliary correlation functions during the exposure time of the ToF measurement, a weighted sum of different auxiliary correlation functions (i.e. different sensor response functions) may be obtained as the correlation function of the ToF measurement. Accordingly, a custom shaped correlation function of the ToF sensor 210 for the ToF measurement may be obtained/adjusted.

For example, for obtaining a correlation function for the ToF measurement that is increasing over distance within the measurement range of the ToF sensor 210, at least one of the illumination signal, the reference signal and the time offset between the illumination signal and the reference signal may be varied such that the auxiliary correlation functions are shifted with respect to each other within the measurement range of the ToF sensor (e.g. shifted along the abscissa in FIG. 3). For example, for creating a correlation function that is increasing over distance within the measurement range of the ToF sensor 210, an auxiliary CM correlation function with one correlation peak may be continuously shifted during exposure.

Alternatively, the speed of the shift may be modulated so that different shifts of the auxiliary CM correlation function are weighted differently in the resulting correlation function. For example, the respective alternating series of high and low pulses may be varied with increasing variation rate for at least one of the illumination signal and the reference signal during the CM measurement. For example, if one of the illumination signal and the reference signal is varied by consecutively selecting different ones of a plurality (pool) of codes used for generating the respective one of the illumination signal and the reference signal, a selection or update rate/frequency may be increased during the CM measurement. Similarly, the time offset between the illumination signal and the reference signal may be varied with increasing variation rate during the CM measurement.

By varying the variation rate, the shift between the resulting auxiliary correlation functions may be modulated so that the auxiliary correlation functions are weighted differently in the overall correlation function for the ToF measurement.

Within the measurement range, the course over distance of the correlation function of the ToF measurement may, e.g., depend on an estimated course over distance of the actual light strength of the light 203 received at the ToF sensor 210. The estimated course over distance of the actual light strength of the light 203 received at the ToF sensor 210 may, e.g., be obtained in a factory calibration. Accordingly, the correlation function of the ToF measurement may be (pre-)determined in the factory calibration. For example, the variations of the illumination signal, the reference signal and the time offset between the illumination signal and the reference signal used during the ToF measurement may be selected/adjusted based on the factory calibration.

Alternatively or additionally, the correlation function of the ToF measurement may be adapted/adjusted on-the-fly (e.g. to correct errors such as distance-dependent errors). For example, the method 100 may comprise performing a plurality of ToF calibration measurements with the ToF sensor 210 for obtaining calibration data indicating the actual light strength of the light 203 received at the ToF sensor 210 for different distances between the ToF sensor 210 and a reference object 201. Accordingly, the calibration data are an estimate for the course of the actual light strength of the light 203 received at the ToF sensor 210. Accordingly, the correlation function of (for) the ToF measurement may be adapted based on the calibration data. For example, the variations of the illumination signal, the reference signal and the time offset between the illumination signal and the reference signal used during the ToF measurement may be adapted (adjusted) based on the calibration data.

Further, drifts of the operational parameters of the illumination element 220 may be taken into account in order to obtain a constant output value of the ToF sensor. For example, the generation of the illumination signal and the operation of the driver electronics in the illumination element 220 are temperature dependent. Therefore, the method 100 may comprise measuring a temperature at the illumination element 220. The apparatus 200 may comprise one or more temperature sensors for measuring the temperature at the illumination element 220. Alternatively or additionally, the method 100 may comprise measuring a light strength and/or a rise time of the modulated light 202 emitted by the illumination element 220. The apparatus 200 may comprise one or more light sensors (e.g. photodiodes) for measuring the light strength and/or the rise time of the modulated light 202 emitted by the illumination element 220. Based on at least one of the measured temperature at the illumination element 220 and the measured light strength and/or rise time of the modulated light 202 emitted by the illumination element 220, at least one of the illumination signal, the reference signal and the time offset between the illumination signal and the reference signal may be varied in order to compensate for temperature-dependent drifts in operation of the illumination element 220.

According to examples, the above described reflectivity sensing may be used along with depth sensing to provide depth and reflectivity data (e.g. depth and reflectivity images). For example, the method 100 may further comprise performing one or more further ToF measurements using the ToF sensor 210. Accordingly, a distance value indicating a distance of the ToF sensor 210 to the object 201 may be determined based on the output of the ToF sensor 210 for the one or more further ToF measurements. Further, data indicating the reflectivity value and the distance value may be output. For example, one or more images indicating the reflectivity value and the distance value may be output may be output.

In other examples, the correlation function increases over distance within the measurement range of the ToF sensor 210, but does not match with the assumed/estimated course of the light strength of light 203 received at the ToF sensor 210. In other words, the correlation function does not satisfy above mathematical expression (2). Adjusting the correlation function such may allow for High Dynamic Range (HDR) imaging.

The examples as described herein may be summarized as follows:

Some examples relate to a method for determining a reflectivity value indicating a reflectivity of an object. The method comprises performing a ToF measurement using a ToF sensor. A correlation function of the ToF measurement is increasing over distance within a measurement range of the ToF sensor such that an output value of the ToF sensor for the ToF measurement is independent of the distance between the ToF sensor and the object. The method further comprises determining the reflectivity value based on the output value of the ToF sensor for the ToF measurement.

According to some examples, the correlation function represents an expected distance-dependent output of the ToF sensor for the ToF measurement assuming that a light strength of light received at the ToF sensor during the ToF measurement is constant over distance within the measurement range of the ToF sensor.

In some examples, determining the reflectivity value comprises applying at least one correction to the output value of the ToF sensor for the ToF measurement.

According to some examples, performing the ToF measurement comprises: illuminating a scene comprising the object with modulated light based on an illumination signal; driving a light capturing element of the ToF sensor based on a reference signal; and varying at least one of the illumination signal, the reference signal and a time offset between the illumination signal and the reference signal during the ToF measurement.

In some examples, each of the illumination signal and the reference signal exhibits a respective alternating series of high and low pulses of equal duration, wherein the time offset between the illumination signal and the reference signal is varied during the ToF measurement.

In alternative examples, at least one of the illumination signal and the reference signal exhibits a respective alternating series of high and low pulses of varying duration, wherein the respective alternating series of high and low pulses is varied for at least one of the illumination signal and the reference signal during the ToF measurement.

According to some examples, the respective alternating series of high and low pulses is varied with increasing variation rate for at least one of the illumination signal and the reference signal during the ToF measurement.

In some examples, the time offset between the illumination signal and the reference signal is varied during the ToF measurement.

According to some examples, the ToF sensor temporarily exhibits a respective auxiliary correlation function for each variation of the illumination signal, the reference signal and the time offset between the illumination signal and the reference signal used during the ToF measurement, wherein the correlation function of the ToF measurement is a combination of the auxiliary correlation functions, and wherein the at least one of the illumination signal, the reference signal and the time offset between the illumination signal and the reference signal is varied such that the auxiliary correlation functions are shifted with respect to each other within the measurement range of the ToF sensor.

In some examples, the modulated light is emitted by an illumination element of the ToF sensor, and the method further comprises: measuring a temperature at the illumination element; and/or measuring a light strength and/or a rise time of the modulated light emitted by the illumination element; and varying the at least one of the illumination signal, the reference signal and the time offset between the illumination signal and the reference signal based on at least one of the measured temperature at the illumination element and the measured light strength and/or rise time of the modulated light emitted by the illumination element.

According to some examples, a course of the correlation function of the ToF measurement over distance depends on an estimated course of an actual light strength of light received at the ToF sensor over distance within the measurement range.

In some examples, wherein the correlation function of the ToF measurement is predetermined in a factory calibration.

According to some examples, the method further comprises: performing a plurality of ToF calibration measurements for obtaining calibration data indicating the actual light strength of light received at the ToF sensor for different distances between the ToF sensor and a reference object; and adapting the correlation function of the ToF measurement based on the calibration data.

In some examples, the method further comprises: performing one or more further ToF measurements using the ToF sensor; determining a distance value indicating a distance to the object based on an output of the ToF sensor for the one or more further ToF measurements; and outputting data indicating the reflectivity value and the distance value.

Other examples relate to an apparatus for determining a value indicating a reflectivity of an object. The apparatus comprises a ToF sensor configured to perform a ToF measurement. A correlation function of the ToF measurement is increasing over distance within a measurement range of the ToF sensor such that an output value of the ToF sensor for the ToF measurement is independent of the distance between the ToF sensor and the object. The apparatus further comprises a processing circuit configured to determine the reflectivity value based on the output value of the ToF sensor for the ToF measurement.

Examples of the present disclosure may enable depth independent intensity imaging with ToF cameras. Examples of the present disclosure introduce a ToF modulation mode, which may deliver a two-dimensional image in which the pixel values depend on the object reflectivity—independent of the distance. In other words, the ToF camera is operated in in a mode in which the sensor output of an object is uniform over the measurement range. This may, e.g., be useful for surveillance and face recognition as two-dimensional images bear more information than depth images for these applications. Reflectivity images contain even more information.

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for determining a reflectivity value indicating a reflectivity of an object, the method comprising:
    performing a Time-of-Flight (ToF) measurement using a ToF sensor, wherein a correlation function of the ToF measurement increases over distance within a measurement range of the ToF sensor such that an output value of the ToF sensor for the ToF measurement is independent of the distance between the ToF sensor and the object; and
    determining the reflectivity value based on the output value of the ToF sensor for the ToF measurement.

2. The method of claim 1, wherein the correlation function represents an expected distance-dependent output of the ToF sensor for the ToF measurement assuming that a light strength of light received at the ToF sensor during the ToF measurement is constant over distance within the measurement range of the ToF sensor.

3. The method of claim 1, wherein determining the reflectivity value comprises applying at least one correction to the output value of the ToF sensor for the ToF measurement.

4. The method of claim 1, wherein performing the ToF measurement comprises:
    illuminating a scene comprising the object with modulated light based on an illumination signal;
    driving a light capturing element of the ToF sensor based on a reference signal; and
    varying at least one of the illumination signal, the reference signal and a time offset between the illumination signal and the reference signal during the ToF measurement.

5. The method of claim 4, wherein each of the illumination signal and the reference signal exhibits a respective alternating series of high and low pulses of equal duration, and wherein the time offset between the illumination signal and the reference signal is varied during the ToF measurement.

6. The method of claim 4, wherein at least one of the illumination signal and the reference signal exhibits a respective alternating series of high and low pulses of varying duration, and wherein the respective alternating series of high and low pulses is varied for at least one of the illumination signal and the reference signal during the ToF measurement.

7. The method of claim 6, wherein the respective alternating series of high and low pulses is varied with increasing variation rate for at least one of the illumination signal and the reference signal during the ToF measurement.

8. The method of claim 6, wherein the time offset between the illumination signal and the reference signal is varied during the ToF measurement.

9. The method of claim 4, wherein the ToF sensor temporarily exhibits a respective auxiliary correlation function for each variation of the illumination signal, the reference signal and the time offset between the illumination signal and the reference signal used during the ToF measurement, wherein the correlation function of the ToF measurement is a combination of the auxiliary correlation functions, and wherein the at least one of the illumination signal, the reference signal and the time offset between the illumination signal and the reference signal is varied such that the auxiliary correlation functions are shifted with respect to each other within the measurement range of the ToF sensor.

10. The method of claim 4, wherein the modulated light is emitted by an illumination element of the ToF sensor, and the method further comprising:
- measuring a temperature at the illumination element; and/or
- measuring a light strength and/or a rise time of the modulated light emitted by the illumination element; and
- varying the at least one of the illumination signal, the reference signal and the time offset between the illumination signal and the reference signal based on at least one of the measured temperature at the illumination element and the measured light strength and/or rise time of the modulated light emitted by the illumination element.

11. The method of claim 1, wherein a course of the correlation function of the ToF measurement over distance depends on an estimated course of an actual light strength of light received at the ToF sensor over distance within the measurement range.

12. The method of claim 1, wherein the correlation function of the ToF measurement is predetermined in a factory calibration.

13. The method of claim 1, further comprising:
- performing a plurality of ToF calibration measurements for obtaining calibration data indicating the actual light strength of light received at the ToF sensor for different distances between the ToF sensor and a reference object; and
- adapting the correlation function of the ToF measurement based on the calibration data.

14. The method of claim 1, further comprising:
- performing one or more further ToF measurements using the ToF sensor;
- determining a distance value indicating a distance to the object based on an output of the ToF sensor for the one or more further ToF measurements; and
- outputting data indicating the reflectivity value and the distance value.

15. An apparatus for determining a value indicating a reflectivity of an object, the apparatus comprising:
- a Time-of-Flight (ToF) sensor configured to perform a ToF measurement, wherein a correlation function of the ToF measurement increases over distance within a measurement range of the ToF sensor such that an output value of the ToF sensor for the ToF measurement is independent of the distance between the ToF sensor and the object; and
- a processing circuit configured to determine the reflectivity value based on the output value of the ToF sensor for the ToF measurement.

* * * * *